No. 736,216. PATENTED AUG. 11, 1903.
A. F. CLARK.
SEPARATOR FOR SECONDARY BATTERIES.
APPLICATION FILED JULY 22, 1901.
NO MODEL.
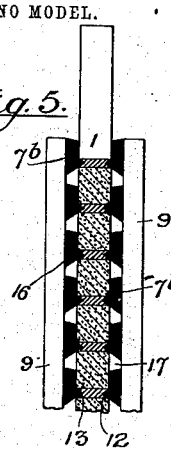
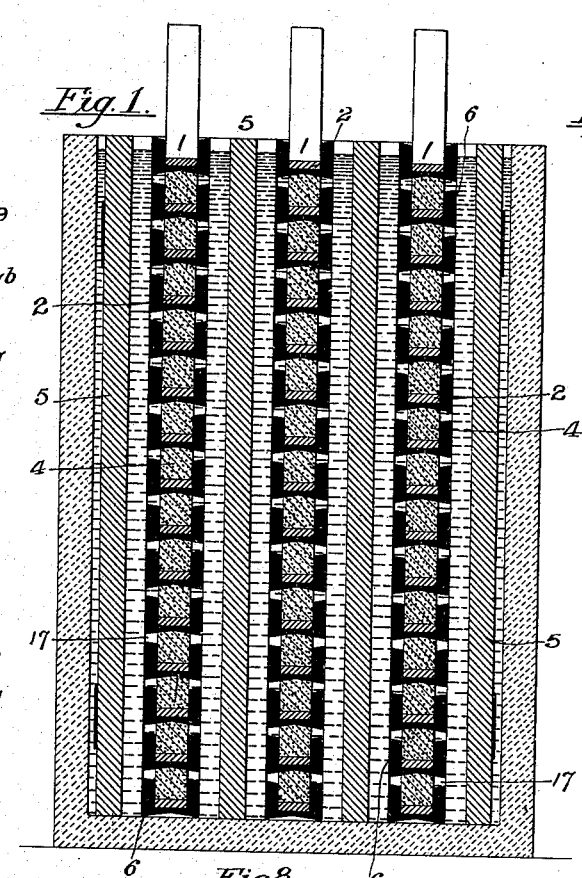
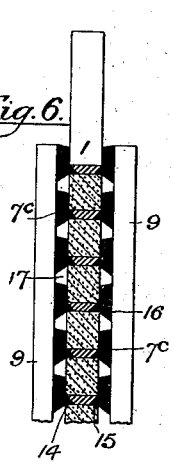
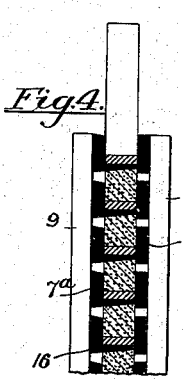
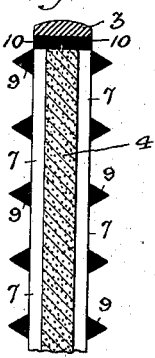
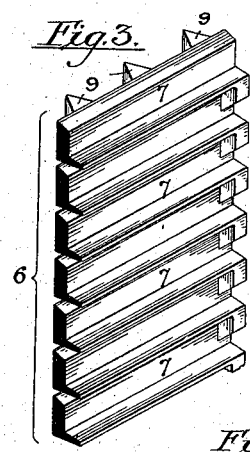
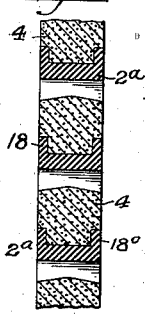
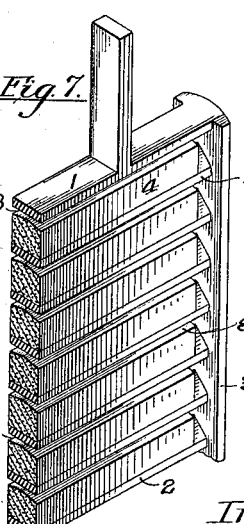
Witnesses:
Inventor:
Absolam F. Clark,
by his Attorneys,
Howson & Howson No. 736,216. Patented August 11, 1903.

UNITED STATES PATENT OFFICE.

ABSOLAM F. CLARK, OF PHILADELPHIA, PENNSYLVANIA, ASSIGNOR TO ELECTRIC VEHICLE EQUIPMENT COMPANY, OF PHILADELPHIA, PENNSYLVANIA, A CORPORATION OF PENNSYLVANIA.

SEPARATOR FOR SECONDARY BATTERIES.

SPECIFICATION forming part of Letters Patent No. 736,216, dated August 11, 1903.

Application filed July 22, 1901. Serial No. 69,254. (No model.)

*To all whom it may concern:*

Be it known that I, ABSOLAM F. CLARK, a citizen of the United States, residing in Philadelphia, Pennsylvania, have invented certain Improvements in Separators for Secondary Batteries, of which the following is a specification.

My invention relates to separators for secondary batteries designed for the purpose of forming a positive support for the grates of the grid, thereby retaining all of the active material in place when the latter begins to break down.

My improved separator forms what may be termed an "envelop," which incloses the entire positive-pole plate.

My invention also includes certain improvements in the positive-pole plates of secondary batteries especially applicable for use with the improved form of separator which I have devised.

My invention is fully illustrated in the accompanying drawings, in which—

Figure 1 is a view of a secondary battery made up of a series of positive and negative pole plates and the separators forming the subject of my invention. Fig. 2 is a sectional plan view of one of said separators. Fig. 3 is a perspective view of a portion of the separator. Figs. 4, 5, and 6 are views illustrating modifications of my improved separator. Fig. 7 is a perspective view of a positive-pole plate for use in connection with the separator shown in Figs. 1 and 3, and Figs. 8 and 9 are views illustrating modified details of such plate.

In all forms of secondary batteries loss of efficiency is due to the breaking away of the active material from the grids forming the positive-pole plates.

The object of my invention is to provide a suitable separator that will insure the isolation of the plates and at the same time positively support the grates of the grid and the active material held therein, confining the latter in contact with its metallic conducting and supporting frame.

In the drawings herewith, 1 represents the positive-pole plates, made up of a grid having the grates or cross-bars 2 and the side pieces 3. Into the spaces formed by said grates or cross-bars the active material 4 is pressed by any suitable mechanism. The negative-pole plates are shown at 5, and interposed between said negative-pole plates are the separators 6. These separators are made up of a series of cross-bars 7, shaped so as to enter a space formed between the grates of the grid and the active material, such active material having been pressed into the grid so as to leave the space shown at 8. The cross-bars of the separator are held together by means of the ribs 9, preferably triangular in cross-section, and the said separator, comprising the cross-pieces 6 and ribs 8, is formed of some non-conducting material capable of being molded—such, for instance, as hard rubber, porcelain, earthenware, celluloid, and the like. The ends of the separator are provided with side frame-pieces 10, adapted to rest within the side pieces 3 of the positive-pole plate, which are wider than the separators, and said side frame-pieces of the separator are notched to correspond with the cross-section of the cross-bars 7.

In Fig. 4 I have illustrated a modified form of separator in which the cross-pieces 7$^a$ extend entirely under the grates of the grid, the other side of the positive-pole plate having a perforated separator-plate 11 adjacent thereto, which may be provided with vertical ribs 9 of the same character as those carried by the other form of separator.

In Fig. 5 I have illustrated a form of separator having cross-pieces 7$^b$, with wedge-shaped edges 12 adapted to triangular recesses 13 in the edge of the grates or cross-bars 2, whereby the latter may be supported.

In Fig. 6 I have shown another form of separator cross-bar 7$^c$, supporting the edges of the grates of the grid. In this instance the grates are beveled on the under side at 14 and the cross-piece has a similarly-beveled portion 15, engaging the beveled portion of the grates.

In all the forms of separators shown and described herewith the cross-bars have a portion extending for a slight distance below their supporting portion, and between this depending piece and the upwardly-projecting portion of the next lower cross-piece a space 17 is provided for the circulation of the electrolyte.

For use with the separator-plate shown in Figs. 1, 2, and 3 or that shown in Fig. 4 it will be necessary to specially mold the active material filling the positive electrode, and in Fig. 7 I have shown a perspective view of a portion of such plate molded to fit the separator-plate shown in Fig. 1, the active material 4 having a beveled upper surface between which and the grates a space is left.

In addition to the form of positive-pole plate shown in Fig. 7 I show in Figs. 8 and 9 other forms of positive-pole plates having modified details. In Fig. 8 the cross-bars or grates $2^a$ are provided with side projections 18, which give additional surface for the active material should the latter break away. These projections are square and of the same height as the space between the active material and the next grate or cross-bar of the grid. In Fig. 9 I have shown projections $18^a$, carried by the grates or cross-bars $2^b$, which are beveled from their upper edges to the surface of the grate. The projections 18 and $18^a$ also serve to retain the active material in place after it has been fitted into the grid. The active material may be put into the grid and pressed into shape therein by suitable dies when plastic, or it may be made in strips by any suitable molding or forming mechanism, cut into proper lengths when dry, and then fitted into the spaces of the grid.

Having thus described my invention, I claim and desire to secure by Letters Patent—

1. As a new article of manufacture, in combination with the plates of a secondary battery, a non-conducting separator having supporting-shelves for the active material carried by the positive-pole plates.

2. As a new article of manufacture, in combination with the plates of a secondary battery, a non-conducting separator having supporting-shelves for the grates of the grids forming the positive-pole plates.

3. As a new article of manufacture, in combination with the plates of a secondary battery, a non-conducting separator having supporting-shelves for the grates of the grids carrying the active material and forming the positive-pole plates.

4. As a new article of manufacture, in combination with the plates of a secondary battery, a non-conducting separator having cross-pieces forming supporting-shelves for the active material carried by the positive-pole plates.

5. As a new article of manufacture, in combination with the plates of a secondary battery, a non-conducting separator having cross-pieces forming supporting-shelves for the active material carried by the positive-pole plates, and spacing members secured to the backs of the supporting-shelves.

6. As a new article of manufacture, in combination with the plates of a secondary battery, a non-conducting separator comprising a frame having L-shaped cross-pieces to support the active material carried by the positive-pole plates.

7. As a new article of manufacture, in combination with the plates of a secondary battery, a non-conducting separator comprising a frame having L-shaped cross-pieces to support the grates of the grids carrying the active material and forming the positive-pole plates.

8. The combination in a secondary battery, of the positive-pole plate having a series of cross-pieces or grates, active material carried in but not filling the spaces between said cross-pieces, and a separator having shelves or supporting portions for the grates and arranged to enter the spaces between the grates and the active material.

9. The combination in a secondary battery, of the positive-pole plate having a series of grates, active material carried in but not filling the spaces between said grates, and a separator having supporting portions for the grates and arranged to enter the spaces between the grates and the active material, said supporting portions being secured together by vertical spacing members.

10. The combination in a secondary battery, of the positive-pole plate having cross-bars between which the active material is disposed, said active material being so disposed as to provide a space between the same and the cross-bars, a separator-plate for use with such plate, and shelves carried by said plate and arranged to enter the spaces between the active material and the cross-bars of the positive plate.

11. As a new article of manufacture, a grated grid filled with active material for use as a positive-pole plate for secondary batteries, said grid having the active material so arranged in the spaces between the grates as to provide spaces or recesses for the insertion of a support for the plates.

12. As a new article of manufacture, a grated grid filled with active material for use as a positive-pole plate for secondary batteries, said grid having the active material so arranged in the spaces between the grates as to provide spaces or recesses for the insertion of a support for the grates and the active material carried thereby and forming the positive-pole plates.

In testimony whereof I have signed my name to this specification in the presence of two subscribing witnesses.

ABSOLAM F. CLARK.

Witnesses:
 MURRAY C. BOYER,
 FLORENCE HILLMAN.